United States Patent
Agapiou et al.

(10) Patent No.: US 10,612,119 B2
(45) Date of Patent: Apr. 7, 2020

(54) SURFACE ROUGHENING TOOL AND METHOD

(71) Applicant: GM GLOBAL TECHNOLOGY OPERATIONS LLC, Detroit, MI (US)

(72) Inventors: John S. Agapiou, Rochester Hills, MI (US); Martin S. Kramer, Clarkston, MI (US); Michael Herold, Mainz (DE); Narasimha Kramadhati, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 510 days.

(21) Appl. No.: 15/359,717

(22) Filed: Nov. 23, 2016

(65) Prior Publication Data
US 2018/0141136 A1 May 24, 2018

(51) Int. Cl.
*B23C 5/18* (2006.01)
*B23C 3/34* (2006.01)
(Continued)

(52) U.S. Cl.
CPC ............ *C23C 4/06* (2013.01); *B23B 27/145* (2013.01); *B23B 29/03* (2013.01); *B23B 41/12* (2013.01); *B23C 3/34* (2013.01); *B24C 1/00* (2013.01); *C23C 4/02* (2013.01); *C23C 4/126* (2016.01); *C23C 4/129* (2016.01); *C23C 4/131* (2016.01); *C23C 4/134* (2016.01); *B23B 2200/204* (2013.01); *B23B 2200/205* (2013.01); *B23B 2215/242* (2013.01); *B23B 2220/12* (2013.01); *B23B 2226/315* (2013.01); *F02F 1/00* (2013.01); *F02F 2200/00* (2013.01)

(58) Field of Classification Search
CPC ........ B23B 2200/204; B23B 2200/205; B23B 27/145; B23B 41/12; B23B 3/34; B23B 29/03; B23B 2226/315; B23B 2215/242
See application file for complete search history.

(56) References Cited

U.S. PATENT DOCUMENTS 3,859,700 A * 1/1975 Jilbert ...................... B23C 3/28
407/103
5,080,056 A 1/1992 Kramer et al.
(Continued)

FOREIGN PATENT DOCUMENTS

DE 4010075 A1 * 10/1991 ........... B23B 51/108
DE 102007030876 B4 4/2009
(Continued)

*Primary Examiner* — Sara Addisu
(74) *Attorney, Agent, or Firm* — Cantor Colburn LLP (57) ABSTRACT

A tool insert includes first, second, and third teeth arranged on a surface of the tool insert. The first tooth is arranged at a proximal end of the tool insert surface and has an angled leading end and a first tooth height. The second tooth is spaced from the first tooth by a first distance along the surface of the tool insert and has a second tooth height greater than the first tooth height. The third tooth is spaced from the second tooth by a second distance along the surface of the tool insert and has an extending angled portion. The first tooth forms a first groove in a bore surface. The second tooth increases the depth of the first groove. The third tooth provides at least one micro-scratch to one of the first groove and the bore surface.

10 Claims, 8 Drawing Sheets

(51) Int. Cl.
  *B24C 1/00* (2006.01)
  *C23C 4/06* (2016.01)
  *C23C 4/126* (2016.01)
  *C23C 4/129* (2016.01)
  *C23C 4/134* (2016.01)
  *C23C 4/131* (2016.01)
  *C23C 4/02* (2006.01)
  *B23B 29/03* (2006.01)
  *B23B 27/14* (2006.01)
  *B23B 41/12* (2006.01)
  *F02F 1/00* (2006.01)

(56) References Cited

U.S. PATENT DOCUMENTS

| | | | |
|---|---|---|---|
| 5,094,573 A * | 3/1992 | Hougen | B23B 51/0406 |
| | | | 407/53 |
| 5,122,040 A * | 6/1992 | Fields | B23C 5/10 |
| | | | 29/888.022 |
| 5,271,967 A | 12/1993 | Kramer et al. | |
| 5,626,674 A | 5/1997 | VanKuiken, Jr. et al. | |
| 5,733,078 A * | 3/1998 | Matsushita | B23G 5/182 |
| | | | 409/74 |
| 5,908,269 A * | 6/1999 | Cox | B23C 3/28 |
| | | | 407/59 |
| 6,132,146 A * | 10/2000 | Satran | B23B 51/048 |
| | | | 407/40 |
| 6,164,877 A * | 12/2000 | Kamata | B23C 5/02 |
| | | | 407/61 |
| 6,200,078 B1 * | 3/2001 | Kubota | B23B 51/048 |
| | | | 407/53 |
| 6,257,810 B1 * | 7/2001 | Schmitt | B23G 5/18 |
| | | | 409/66 |
| 6,322,296 B1 * | 11/2001 | Wetli | B23C 3/30 |
| | | | 407/42 |
| 6,622,685 B2 | 9/2003 | Takahashi et al. | |
| 7,007,382 B2 * | 3/2006 | Mantel | B24B 19/02 |
| | | | 29/557 |
| 7,568,273 B2 | 8/2009 | Iizumi et al. | |
| 7,614,272 B2 | 11/2009 | Sekikawa et al. | |
| 8,286,468 B2 | 10/2012 | Nishimura et al. | |
| 8,360,694 B2 * | 1/2013 | Sjoo | B23B 29/24 |
| | | | 407/113 |
| 8,726,874 B2 | 5/2014 | Whitbeck et al. | |
| 2008/0193232 A1 * | 8/2008 | van Iperen | B23C 5/10 |
| | | | 407/54 |
| 2010/0014929 A1 * | 1/2010 | Stojanovski | B23B 27/007 |
| | | | 407/54 |
| 2010/0031799 A1 | 2/2010 | Ast et al. | |
| 2014/0227046 A1 | 8/2014 | Ast et al. | |
| 2015/0151369 A1 | 6/2015 | Gand et al. | |
| 2016/0130691 A1 | 5/2016 | Wang | |
| 2016/0258047 A1 | 9/2016 | Wang et al. | |

FOREIGN PATENT DOCUMENTS

| | | |
|---|---|---|
| DE | 102008058452 A1 | 2/2010 |
| JP | 2006097045 A | 4/2006 |

* cited by examiner

SURFACE ROUGHENING TOOL AND METHOD

FIELD

The present disclosure relates to a surface roughening tool and a method for using the surface roughening tool.

INTRODUCTION

The statements in this section merely provide background information related to the present disclosure and may not constitute prior art.

Cutting tools are often used for removing material from a workpiece to bring the workpiece into final manufactured tolerances or so that the surface is suitable for additional processing. For example, a cutting tool can be used for roughening a workpiece surface in preparation for applying a metallic coating to the roughened surface, and subsequently honing the metallic coating to obtain a finished surface dimension, wear resistance, and strength.

SUMMARY

A tool insert includes first, second, and third teeth arranged on a surface of the tool insert. The first tooth is arranged at a proximal end of the tool insert surface and has an angled leading end and a first tooth height. The second tooth is spaced from the first tooth by a first distance along the surface of the tool insert and has a second tooth height greater than the first tooth height. The third tooth is spaced from the second tooth by a second distance along the surface of the tool insert and has an extending angled portion. The first tooth forms a first groove in a bore surface. The second tooth increases the depth of the first groove. The third tooth provides at least one micro-scratch to one of the first groove and the bore surface.

A tool insert includes first, second, and third teeth arranged on a surface of the tool insert. The first tooth is arranged at a proximal end of the tool insert surface and has an angled leading end and a first tooth height. The second tooth is spaced from the first tooth by a first distance along the surface of the tool insert and has a second tooth height greater than the first tooth height. The third tooth is spaced from the second tooth by a second distance along the surface of the tool insert and has a third tooth height greater than the first tooth height and less than the second tooth height.

A method for activating a surface for receiving a coating material includes forming a plurality of grooves in the surface over a predetermined distance with a cutting tool insert. The plurality of grooves have one of a double and a triple lead. Next, a plurality of micro-undercuts are formed in the surface with an abrasive jet tool. The micro-undercuts are arranged on the surface and on the grooves. Finally, the coating material is applied to the surface. The grooves and the micro-undercuts are configured to provide increased surface area and mechanical interlock features for adhesion and mechanical bonding between the surface and the coating material.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Further, directions such as "top," "side," "back", "lower," and "upper" are used for purposes of explanation and are not intended to require specific orientations unless otherwise stated. These directions are merely provided as a frame of reference with respect to the examples provided, but could be altered in alternate applications.

The present disclosure describes various surface roughening or cutting tools and methods of using these tools in a manufacturing environment. The cutting tools of the present disclosure are commonly used in surface preparation for commercial products in which it is desirable to apply a thermal spray metal coating to a base metal surface. The application of such a coating can provide more wear or corrosion resistance than the base layer material alone. As surface roughness is important for coating bond strength, the surface must be activated by a roughening process before the coating is applied. There are numerous processes available for surface activation, each with its own specific advantages and disadvantages (i.e., mechanical activation, chemical activation, surface blasting with water or laser). The ideal process and parameters are highly dependent on the coating process used.

With reference to the drawings, wherein like reference numbers refer to like components, one exemplary method for forming a scuff and wear resistant liner between an aluminum piston and an aluminum engine block used in automotive engines includes providing a hybrid surface activation process. The hybrid process includes a combination of both mechanical activation with a cutting tool and a surface blasting (e.g., water jet) in order to generate a repeatable, geometrically-defined surface having an increased surface area with multiple interlock features thereon.

Figure 1:
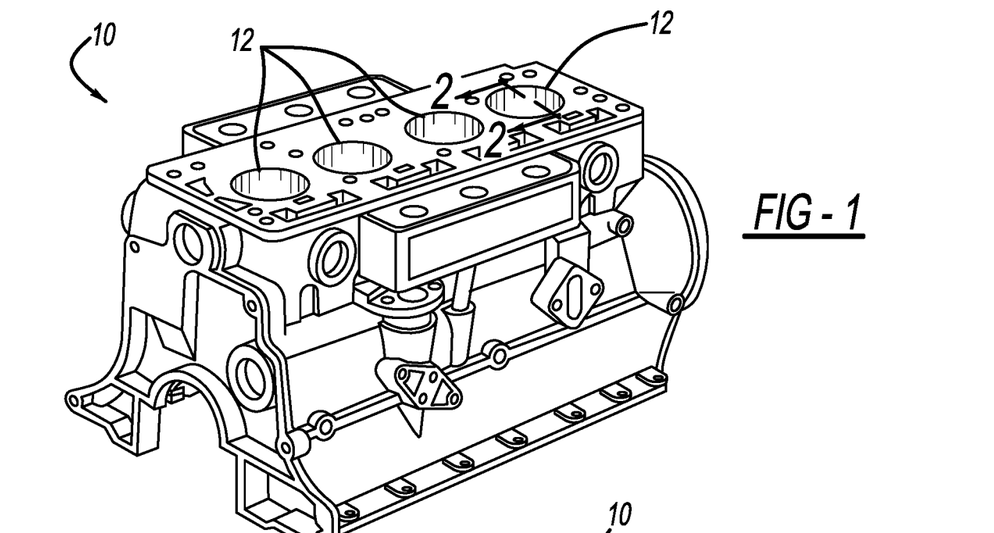
FIG. 1 is a perspective view of an exemplary engine block of an internal combustion engine.

In particular and as shown in FIG. 1, an exemplary four-cylinder automotive internal combustion engine block 10 is provided with a plurality of cylinder bores 12. Aluminum or magnesium alloy materials (e.g., A380, A319 or A356) are advantageously used for the engine block 10 because of their relatively light weight compared to steel or iron, which may improve engine power output and fuel economy. However, when these lightweight materials are used to construct engine blocks, certain processes are needed to enhance strength and wear resistance of the cylinder bores 12. These bores 12 may include an alloyed surface layer that is either a separate insert or sleeve that is sized to fit securely within the bore 12, or is integrally formed with the substrate of each bore 12. Such alloyed surface layer can be used to enhance the corrosion, wear or thermal resistance of the bore 12.

Figure 2A:
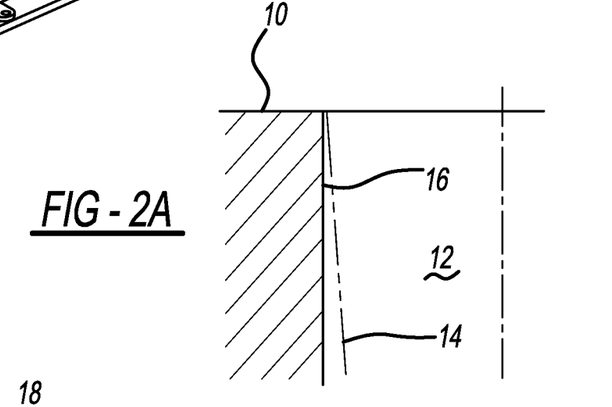
FIG. 2A is a cross-sectional view of an exemplary cylinder bore of the engine block of FIG. 1, the view depicting a cylinder bore after a pre-boring step in which an unmachined inner diameter of the cylinder bore is bored to a rough machined diameter.

With reference to FIG. 2A, a cross-sectional view of the cylinder bore 12 is shown as taken along line 2-2 of FIG. 1. The engine block 10 includes the cylinder bore 12, which may be formed of a metal material, such as, but not limited to, aluminum, magnesium, steel, or iron, or an alloy thereof, and having an unmachined inner diameter 14 (shown dashed in FIG. 2A). Various steps are taken to prepare the unmachined inner diameter 14 of the cylinder bore 12. For example, in a first step, the unmachined inner diameter 14 of the cylinder bore 12 may be bored to a rough machined diameter 16. The rough boring operation may bring the bore into round and may remove vertical variation from the casting process.

Figure 2B:
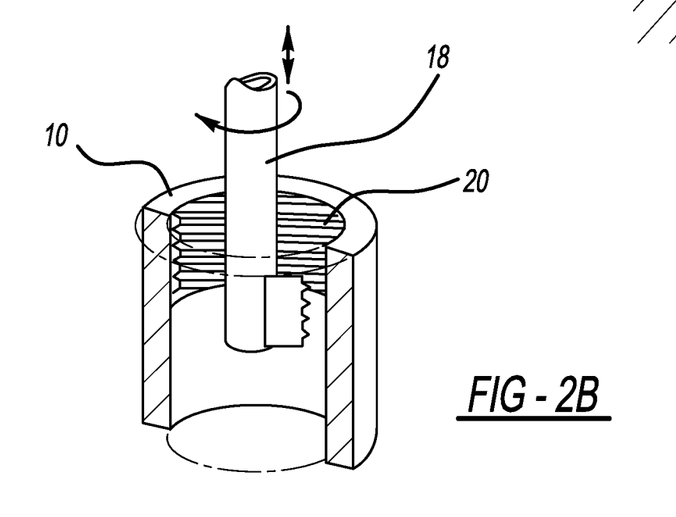
FIG. 2B is a cross-sectional view of the exemplary cylinder bore of the engine block of FIG. 1, the view depicting an exemplary cutting tool forming grooves in the surface of the rough machined diameter of the cylinder bore.

With reference now to FIG. 2B, a surface roughening process can be accomplished with a cutting tool 18. The exemplary cutting tool 18 forms a series of circumferentially-extending grooves 20 in the surface of the rough machined diameter 16 of the cylinder bore 12. The exemplary cutting tool 18 may form the grooves 20 either individually or substantially simultaneously through a spiral rotation or a circular interpolation operation. It should be understood that the size, shape, and number of grooves 20 as depicted are merely exemplary, and that the grooves 20 preferably extend over substantially the entire length of travel of a piston within the cylinder bore 12.

Figure 2C:
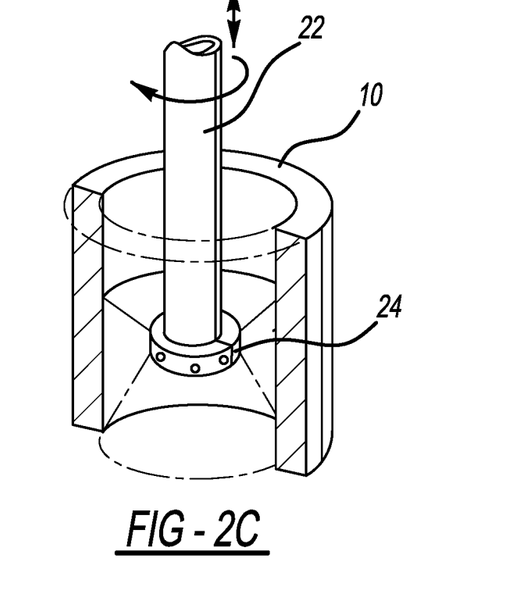
FIG. 2C is a cross-sectional view of the exemplary cylinder bore of the engine block of FIG. 1, the view depicting an abrasive jet tool abrading the grooved surface of the cylinder bore.

With reference to FIG. 2C, a secondary roughening step can be accomplished with an abrasive jet tool 22. The exemplary abrasive jet tool 22 includes a rotating spray head 24 that is translated vertically along the axis of the cylinder bore 12 to wash away all debris, dirt, oil and the like which would provide a local barrier between the surface of the cylinder bore 12 and the thermal spray alloy to be applied. Concurrently, the abrasive jet tool 22 abrades the surface (e.g., at the grooves 20) so as to form a large number of very small pits with undercuts, which provide increased surface area and mechanical interlock features for adhesion and mechanical bonding between the base metal and the thermal spray coating. Variables in the distance from the spray head 24 to the cylinder bore 12, the speed of rotation of the spray head 24, and the traverse rate of the abrasive jet tool 22 will depend upon the material being propelled (e.g., water, glass, aluminum oxide, silicon carbide), the material being treated, the extent of the aggressive surface desired, and the pressure of the jets. This additional roughening of the cylinder bore 12 enhances the adhesion and bonding of the thermal sprayed coating to be adhered to the cylinder bore 12.

Figure 2D:
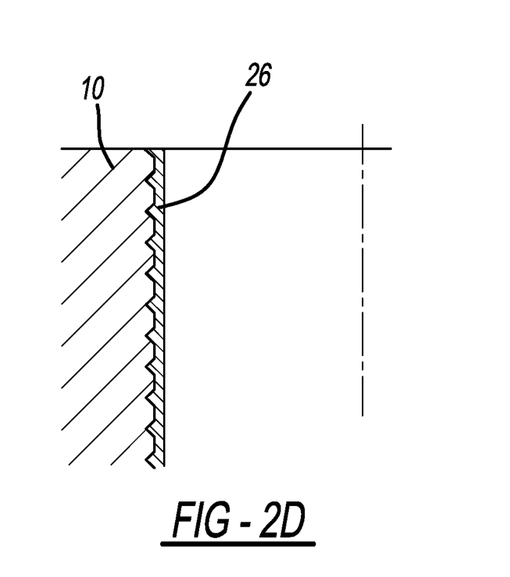
FIG. 2D is a cross-sectional view of the exemplary cylinder bore of the engine block of FIG. 1, the view depicting the profile applied to the inner diameter of the cylinder bore.

Referring now to FIG. 2D, the thermal spray coating 26 may be any kind of coating material such as metal, ceramic, or cermet alloy compositions that may be applied to the roughened cylinder bore 12 in order to essentially function as a cylinder liner. The thermal spray coating process could include a combustion, electrical or high pressure gas jet method. Within each of the aforementioned methods, it is also possible to use either powder particles or wire to generate the molten particles to coat the surface. In one example, molten particles may be generated from powder particles through the use of flame spray, high velocity oxygen fuel, plasma spray, or the like. In another example, molten particles may be generated from material in a wire through the use of flame wire spray, arc wire spray, or the like. In the thermal spray coating process, a high velocity oxyhydrocarbon fuel practice is employed to melt and atomize a metallic composition (e.g., an aluminum-bronze). The atomized droplets are sprayed onto the surface of the cylinder bore 12 to form a dense coating of suitable thickness. Thermal spray methods differ in the way that the coating alloy is melted and atomized and propelled against the surface to be coated. For example, melting may be accomplished by electrical means, by plasma heating or by heating with hot combustion gases. A suitable hot gas is typically used to atomize and propel the molten metal against the target surface. The droplets solidify on the colder surface and fuse to form a dense coating, which can then be finish honed to a final bore dimension.

As should be understood, the surface roughening process is a precondition if the sprayed particles are to adhere to the cylinder bore surface and, ultimately, for providing the coating bond strength. The mechanical activation step (e.g., using a cutting tool) provides a geometrically defined surface that is secure and repeatable for retaining the thermal spray coating. As such, various geometries for the surface roughening tool and methods for use of the tool are contemplated, as will be described in detail below.

Figure 3A:
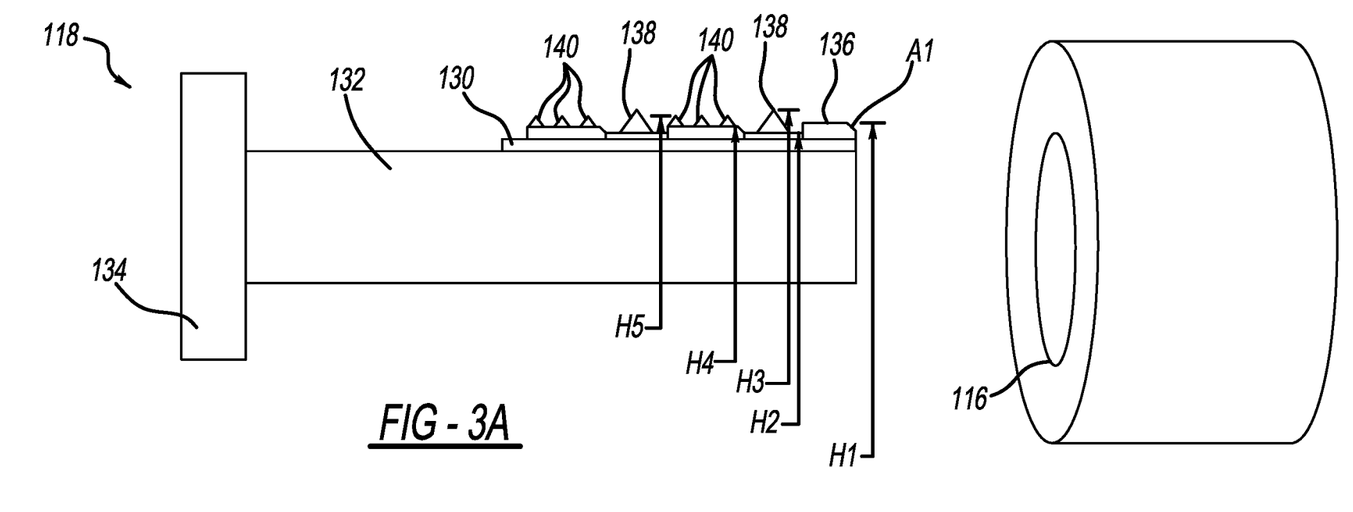
FIG. 3A is a perspective view of an exemplary cutting tool prior to insertion in a bore according to the present disclosure.

With reference now to FIG. 3A, an exemplary cutting tool 118 is depicted having an insert 130 (e.g., polycrystalline diamond) laterally attached to a boring bar 132, which is in turn, coaxially chucked to an axially feedable spindle head 134. The insert 130 includes a plurality of sharp cutting edges (e.g., leading tooth 136, groove forming teeth 138, shaping teeth 140) adapted to come in contact with the workpiece (e.g., rough machined diameter 116) within a cutting zone to remove material therefrom in a predetermined arrangement. During the material removal process, there is a linear displacement (e.g., feed) and a rotation (e.g., speed) of the cutting tool 118 relative to the rough machined diameter 116. The amount of material to be removed per time unit by a given cutting tool from a given workpiece is controlled by the feed and speed of rotation of the cutting tool relative to the workpiece.

As can be seen, the insert 130 includes the leading tooth 136 having an angled leading end A1 (e.g., 30 degrees) and a projection height H1 (e.g., diameter of 93.02 mm). The leading tooth 136 may extend over any predetermined length (e.g., approximately 0.3 mm). The height H1 of the tooth 136 has a reduced projecting length in comparison with the subsequent groove forming teeth 138 and shaping teeth 140. The leading tooth 136 can be used for guiding and stabilizing the groove forming and shaping teeth 138, 140 at insertion into the rough machined diameter 116 (e.g., diameter of 91.00 mm). The leading tooth 136 generates the new bore surface diameter H1 (e.g., diameter 93.02 mm). Furthermore, the angled leading end A1 allows for a deeper cut into the material and reduces the hoop stress that would be generated by a conventional thread angle form.

In one example, the groove forming teeth 138 extend from a root surface H2 (e.g., diameter of 92.75 mm) to a projecting height H3 (e.g., diameter of 93.12 mm). The groove forming teeth 138 may be presented in an equilateral triangular configuration having a rounded upper tip (e.g., height of tooth from base to tip of 0.05 mm). The tool design of FIG. 3A illustrates a single groove forming tooth 138 in a series, but depending upon the depth of the groove required, more than one tooth 138 may be provided in series with increasing height so as to distribute the cutting load between multiple teeth (i.e., reducing stress on individual teeth and minimizing the chance of a broken tooth).

The shaping teeth 140 may be arranged to extend from a root surface H4 (e.g., diameter of 92.80 mm) to a projecting height H5 (e.g., diameter of 93.07 mm). The shaping teeth 140 may also be presented in an equilateral triangular configuration having a rounded upper tip (e.g., height of tooth from base to tip of 0.025 mm). When the cutting tool 118 is introduced to the rough machined diameter 116 in a spiral rotation operation (e.g., feed at 0.4 mm per revolution), subsequently introduced teeth or cutting edges (e.g., groove forming teeth 138, shaping teeth 140) primarily experience a constant force, thereby improving groove precision and loading on tool teeth. The insert 130 can form threads that are continuous or discontinuous so as to define threads having multiple starts (e.g., double lead), which provide a locking mechanism for the coating within the cylinder bore. It should be noted that the number of the shaping teeth 140 could vary based on an optimization of the distance between the shaping teeth 140 on the surface profile for the water-jet process. Furthermore, the addition of redundant teeth allows for an increase in tool life (e.g., an extra tooth to take over the cutting process if the first or second tooth fails), which assists in providing a stable process having appropriate tool life for high volume production.

Figure 3B:
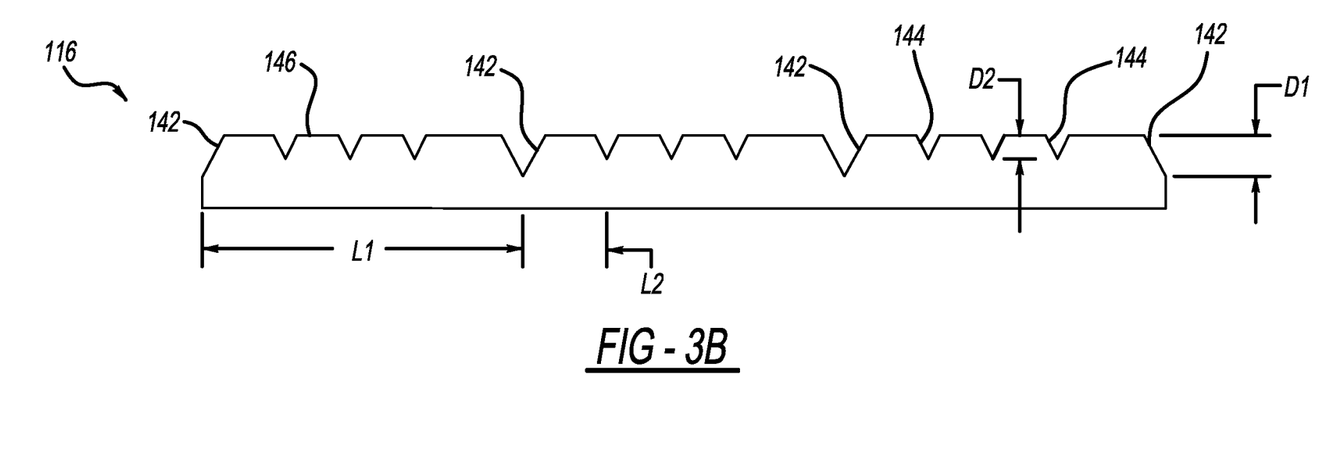
FIG. 3B is a schematic view of a surface profile formed by the exemplary cutting tool of FIG. 3A.

With reference now to FIG. 3B, a specific surface profile (macro-geometry) results from the geometry and kinematic motions of the cutting tool 118. The rough machined diameter 116 includes a plurality of grooves 142 formed by the groove forming teeth 138 and a plurality of micro-scratches 144 formed by the shaping teeth 140. The grooves 142 are presented at a depth D1 (e.g., 0.05 mm) from surface 146, while the micro-scratches 144 are presented at a depth D2 (e.g., 0.025 mm) from surface 146. Subsequent grooves 142 are separated by a distance L1 (e.g., 0.2 mm) from groove tip-to-tip, while the distance between the groove 142 and the nearest micro-scratch 144 is separated by a distance L2 (e.g., 0.025 mm).

The exemplary cutting tool 118 provides a repeatable surface that maximizes the action of the secondary roughening tool (e.g., medium pressure water jet) during the subsequent roughening steps. Furthermore, micro-scratches on the surface and grooves may increase the penetration and effectiveness of the water-jet process. The micro-scratches act as initiators to surface cracks by the water-jet conditions (i.e., supply pressure, jet exposure time, nozzle traverse rate) to generate multiple micro-undercuts through cavitation erosion. The abrasive water-jet provides refinement of the surface profile to further roughen the surface with micro-undercuts. By adapting the process parameters, the surface characteristics can be modified while the profile may remain the same. The water-jet ploughing the grains on the surface results in transgranular or intergranular propagation of cracks. As a consequence, break away and pulling out of grains are mechanisms for material removal during water-jet treatment, in order to produce a rough surface with micro- and macro-undercuts.

Figure 4A:
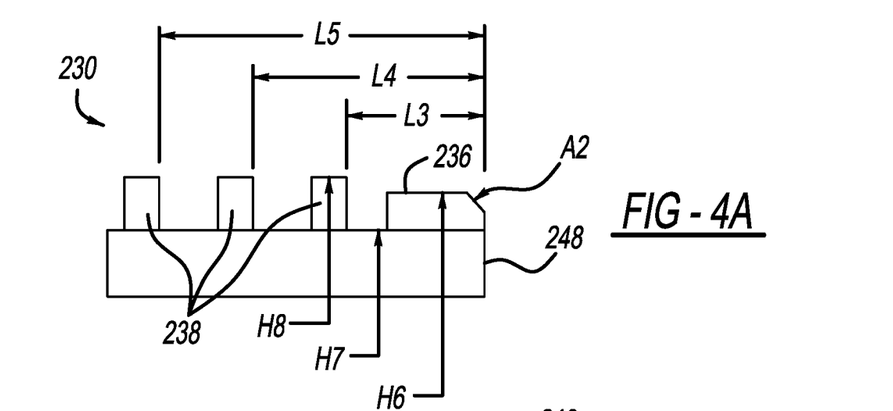
FIG. 4A is a perspective view of an exemplary cutting tool insert according to the present disclosure.

With reference now to FIG. 4A, another exemplary insert 230 for a cutting tool is depicted having a plurality of cutting edges (e.g., leading tooth 236, rectangular groove forming teeth 238) adapted to come in contact with the workpiece within a cutting zone to remove material therefrom in a predetermined arrangement. As can be seen, the insert 230 includes the leading tooth 236 having an angled leading end A2 (e.g., 30 degrees) and a projection height H6 (e.g., diameter of 93.02 mm). The leading tooth 236 may extend over any predetermined length (e.g., approximately 0.3 mm). The height H6 of the tooth 236 has a reduced projecting length in comparison with the subsequent groove forming teeth 238. The leading tooth 236 can be used for guiding and stabilizing the groove forming teeth 238 at insertion into the rough machined diameter (e.g., diameter of 91.00 mm). Furthermore, the angled leading end A2 allows for a deeper cut into the material and reduces the hoop stress that would be generated by a conventional thread angle form.

In one example, the groove forming teeth 238 extend from a root surface H7 (e.g., diameter of 92.75 mm) to a projecting height H8 (e.g., diameter of 93.22 mm). The lead ends of the three groove forming teeth 238 are spaced from a proximal end 248 of the insert 230 by distances L3 (e.g., 0.83 mm), L4 (e.g., 2.43 mm), and L5 (e.g., 4.03 mm). The groove forming teeth 238 may be presented in a rectangular configuration for generating the specific surface profile (macro-geometry) depicted in FIG. 4B. When the cutting tool is introduced to the rough machined diameter in a spiral rotation operation (e.g., feed at 1.2 mm per revolution), subsequently introduced teeth or cutting edges (e.g., groove forming teeth 238) primarily experience a constant force, thereby improving groove precision and loading on tool teeth. The three rectangular teeth 238 can generate grooves at a high feed rate. Furthermore, the insert 230 can form threads that are continuous or discontinuous so as to define threads having multiple starts (e.g., triple lead), which provide a locking mechanism for the coating within the cylinder bore. While depicted as having three rectangular teeth, it is contemplated that the insert 230 could incorporate additional teeth to minimize loading as previously described. In this example, the redundant teeth will be located at a predetermined distance from the leading tooth 236 to provide grooves at the particular tool revolution (e.g., at a distance of a multiple of 1.2 mm).

Figure 4B:
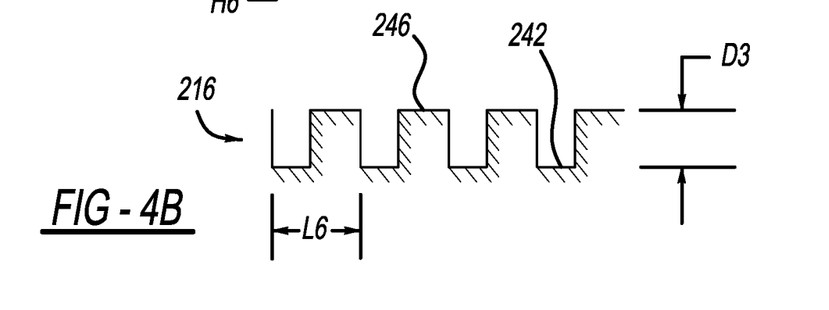
FIG. 4B is a schematic view of a surface profile formed by the exemplary cutting tool insert of FIG. 4A.

With reference now to FIG. 4B, the rough machined diameter 216 includes a plurality of grooves 242 formed by the groove forming teeth 238, presented at a depth D3 (e.g., 0.10 mm) from surface 246. Subsequent grooves 242 are separated by a distance L6 (e.g., 0.4 mm) from groove lead end-to-lead end. Notably, the insert 230 generates grooves with a triple lead (i.e., three grooves at 0.4 mm apart for 1.2 mm feed per revolution). The exemplary insert 230 provides a repeatable surface that maximizes the action of the secondary roughening tool (e.g., medium pressure water jet) during the subsequent roughening steps. The depth D3 is optimized for the water jet conditions and the surface characteristics generated, such that the rectangular shape of the groove 242 is deformed to generate the undercuts on the top surface and root of the grooves.

Figure 5A:
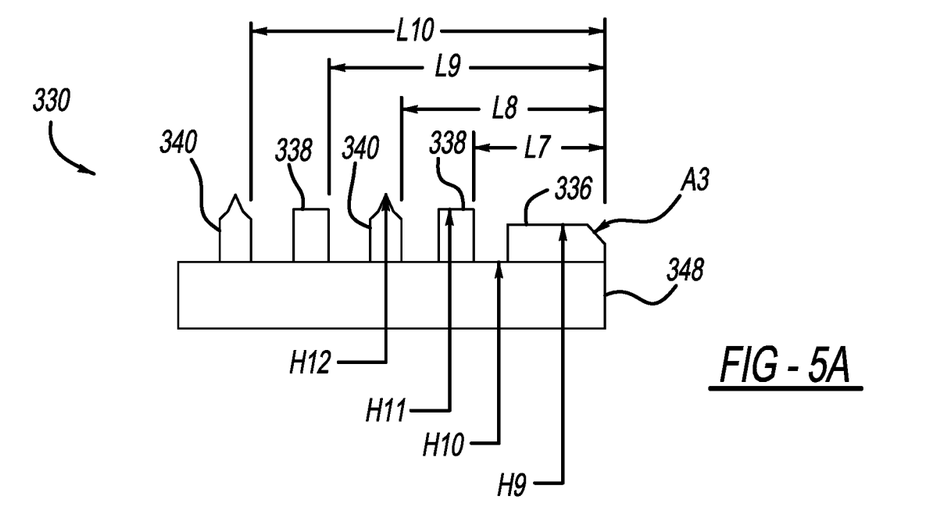
FIG. 5A is a perspective view of another exemplary cutting tool insert according to the present disclosure.

With reference now to FIG. 5A, another exemplary insert 330 for a cutting tool is depicted having a plurality of cutting edges (e.g., leading tooth 336, rectangular groove forming teeth 338, shaping teeth 340) adapted to come in contact with the workpiece within a cutting zone to remove material therefrom in a predetermined arrangement. As can be seen, the insert 330 includes the leading tooth 336 having an angled leading end A3 (e.g., 30 degrees) and a projection height H9 (e.g., diameter of 93.02 mm). The leading tooth 336 may extend over any predetermined length (e.g., approximately 0.3 mm). The height H9 of the tooth 336 has a reduced projecting length in comparison with the subsequent rectangular groove forming teeth 338 and shaping teeth 340. The leading tooth 336 can be used for guiding and stabilizing the groove forming and shaping teeth 338, 340 at insertion into the rough machined diameter (e.g., diameter of 91.00 mm). Furthermore, the angled leading end A3 allows for a deeper cut into the material and reduces the hoop stress that would be generated by a conventional thread angle form.

In one example, the groove forming teeth 338 extend from a root surface H10 (e.g., diameter of 92.75 mm) to a projecting height H11 (e.g., diameter of 93.22 mm). The shaping teeth 340 may be arranged to extend from the root surface H10 to a projecting height H12 (e.g., diameter of 93.27 mm). The groove forming teeth 338 may be presented in a rectangular configuration, while the shaping teeth 340 may be presented with a rectangular base ending in an equilateral triangular configuration having a rounded upper tip (e.g., height of triangle from base to tip of 0.025 mm). The lead ends of the alternating groove forming teeth 238 and shaping teeth 340 are spaced from a proximal end 348 of the insert 330 by distances L7 (e.g., 0.83 mm), L8 (e.g., 2.03 mm), L9 (e.g., 3.23 mm), and L10 (e.g., 4.43 mm). When the cutting tool is introduced to the rough machined diameter in a spiral rotation operation (e.g., feed at 0.8 mm per revolution), subsequently introduced teeth or cutting edges (e.g., groove forming teeth 338, shaping teeth 340) primarily experience a constant force, thereby improving groove precision and loading on tool teeth. The insert 330 can form threads that are continuous or discontinuous so as to define threads having multiple starts (e.g., double lead), which provide a locking mechanism for the coating within the cylinder bore. The insert 330 generates grooves with a double lead (i.e., two grooves at 0.4 mm apart at 0.8 mm feed per revolution). Additional shaping teeth 340 can be incorporated on the insert 230 at a specified distance in order to increase the number of micro-scratches at the root of the groove. Additional forming teeth 338 can also be in included on the insert 330 to distribute loading. Furthermore, redundant forming teeth 338 can also be incorporated on the insert 330 to increase the reliability of the insert, as previously described.

Figure 5B:
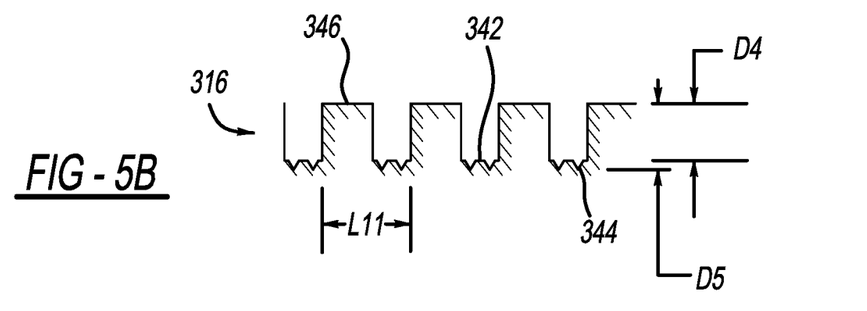
FIG. 5B is a schematic view of a surface profile formed by the exemplary cutting tool insert of FIG. 5A.

With reference now to FIG. 5B, the rough machined diameter 316 includes a plurality of grooves 342 formed by the groove forming teeth 338 having a plurality of micro-scratches 344 formed by the shaping teeth 340. The grooves 342 are presented at a depth D4 (e.g., 0.1 mm) from surface 346, while the micro-scratches 344 are presented at a depth D5 (e.g., 0.025 mm) from surface 346. Subsequent grooves 342 are separated by a distance L11 (e.g., 0.40 mm) from groove lead end-to-lead end, with micro-scratches 344 within each groove 342. The exemplary insert 330 provides a repeatable surface that maximizes the action of the secondary roughening tool (e.g., medium pressure water jet) during the subsequent roughening steps.

Figure 5C:
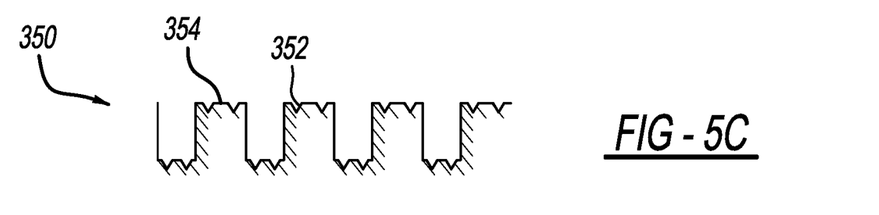
FIG. 5C is a schematic view of a surface profile formed by a modified version of the exemplary cutting tool insert of FIG. 5A.

Referring now to FIG. 5C, an optional surface profile for a rough machined diameter 350 is depicted. The rough machined diameter 350 is similar to the rough machined diameter 316, but for the addition of a plurality of micro-scratches 352 at the surface 354. The micro-scratches 352 are formed by the addition of shaping teeth (not shown) arranged on the insert 330 at the root surface H10. Although depicted as a dual micro-scratch 352 arrangement on the surface 354, it should be understood that any number of micro-scratches 352 at any location can be achieved through placement of the shaping teeth on the insert 330 at various heights and distances. The depth D4 and the number of micro-scratches and their corresponding depth D5 are optimized for the water jet conditions and the surface characteristics generated.

Figure 6A:
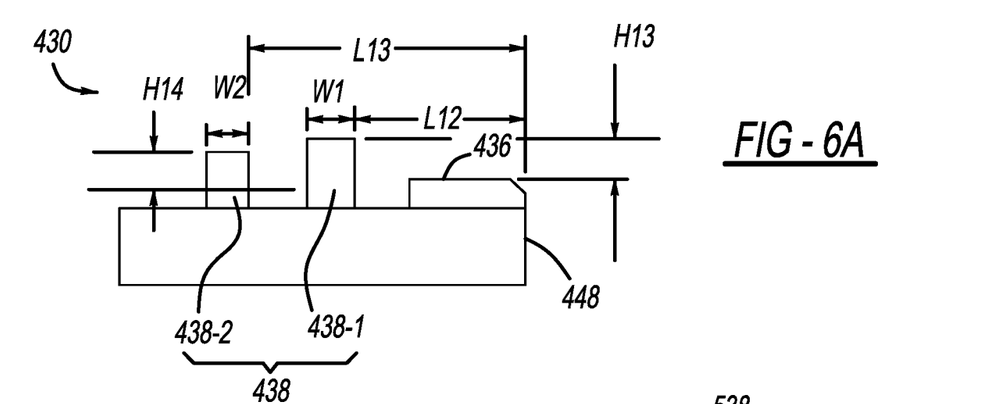
FIG. 6A is a perspective view of another exemplary cutting tool insert according to the present disclosure.

With reference now to FIG. 6A, another exemplary insert 430 for a cutting tool is depicted having a plurality of cutting edges (e.g., leading tooth 436, rectangular groove forming teeth 438) adapted to come in contact with the workpiece within a cutting zone to remove material therefrom in a predetermined arrangement. As can be seen, the insert 430 is substantially similar to the insert 230, and as such, will only be described with respect to the notable differences. In particular, the projecting lengths and widths of the rectangular groove forming teeth 438 and the distance from a proximal end 448 of the insert 430 are varied from those of the insert 230. With further detail, the proximal groove forming tooth 438-1 projects above the leading tooth 436 by a height H13 (e.g., 0.070 mm) and has a width W1 (e.g., 0.20 mm) at a distance L12 from the proximal end 448 (e.g., 2.80 mm), while the distal groove forming tooth 438-2 only projects by a height H14 (e.g., 0.060-0.065 mm) and has a width W2 (e.g., 0.185-0.190 mm) at a distance L13 from the proximal end 448 (e.g., 3.605 mm). As should be understood, the tooth 438-2 is designed as a redundant tooth to increase the reliability of the insert 430.

Figures 6B, 6C:
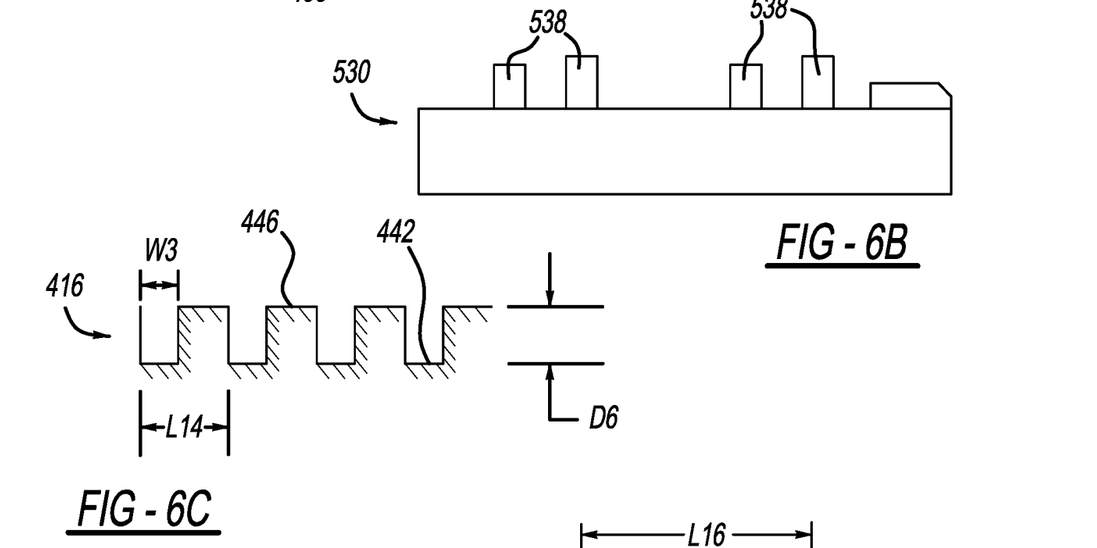
FIG. 6B is a perspective view of another exemplary cutting tool insert according to the present disclosure.
FIG. 6C is a schematic view of a surface profile formed by the exemplary cutting tool inserts of FIGS. 6A and 6B.

With reference now to FIG. 6B, another exemplary insert 530 for a cutting tool is depicted having a plurality of cutting edges adapted to come in contact with the workpiece within a cutting zone to remove material therefrom in a predetermined arrangement. As can be seen, the insert 530 is substantially similar to the insert 430; however, the insert 530 includes a secondary set of rectangular groove forming teeth 538 offset from the first set of rectangular groove forming teeth 538 (e.g., offset by a distance of 2.00 mm).

Referring now to FIG. 6C, a rough machined diameter 416 includes a plurality of grooves 442 formed by the groove forming teeth 438, 538, presented at a depth D6 (e.g., 0.070 mm) from surface 446. Subsequent grooves 442 are separated by a distance L14 (e.g., 0.40 mm) from groove lead end-to-lead end, with each groove 442 having a width W3 (e.g., 0.20 mm). The exemplary inserts 430, 530 provide a repeatable surface that maximizes the action of the secondary roughening tool (e.g., medium pressure water jet) during the subsequent roughening steps. As should be understood, each groove 442 in the rough machined diameter 416 is formed by the first tooth 438-1. The second tooth 438-2 is designed to cut only if the first tooth 438-1 fails (i.e., breaks off). The distinct difference between the inserts 430 and 530 is that the grooves 442 generated by the insert 530 have a double lead.

Figure 7A:
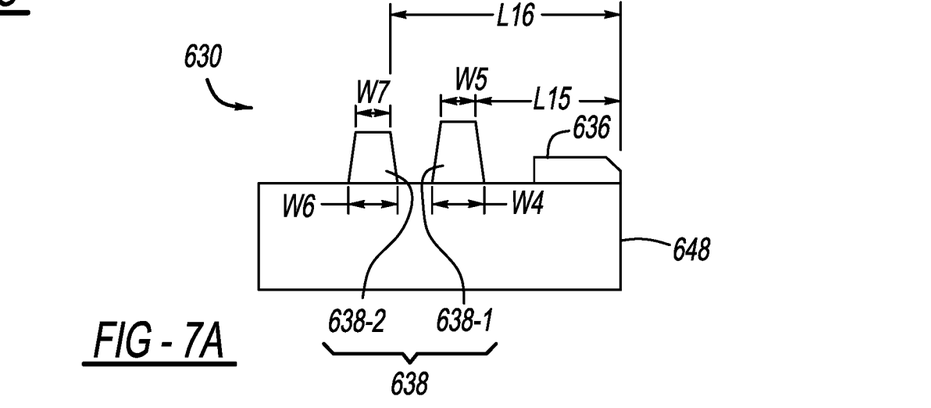
FIG. 7A is a perspective view of another exemplary cutting tool insert according to the present disclosure.

With reference now to FIG. 7A, another exemplary insert 630 for a cutting tool is depicted having a plurality of cutting edges (e.g., leading tooth 636, trapezoidal groove forming teeth 638) adapted to come in contact with the workpiece within a cutting zone to remove material therefrom in a predetermined arrangement. As can be seen, the insert 630 is substantially similar to the insert 430, and as such, will only be described with respect to the notable differences. In particular, the shape of the groove forming teeth 638 is varied from that of the insert 430. With further detail, the proximal groove forming tooth 638-1 has a trapezoidal shape with a base width W4 (e.g., 0.20 mm) and a tip width W5 (e.g., 0.15 mm), the tip arranged at a distance L15 (e.g., 2.80 mm) from a proximal end 648 of the insert 630, while the distal groove forming tooth 638-2 has a trapezoidal shape with a base width W6 (e.g., 0.185-0.190 mm) and a tip width W7 (e.g., 0.135-0.140 mm), the tip arranged at a distance L16 (e.g., 3.605 mm) from a proximal end 648 of the insert 630.

Figure 7B:
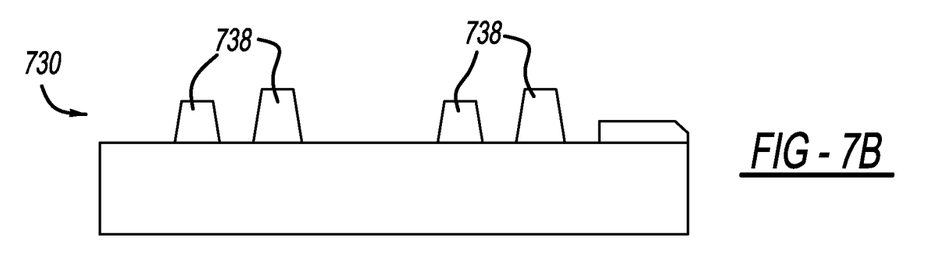
FIG. 7B is a perspective view of another exemplary cutting tool insert according to the present disclosure.

With reference now to FIG. 7B, another exemplary insert 730 for a cutting tool is depicted having a plurality of cutting edges adapted to come in contact with the workpiece within a cutting zone to remove material therefrom in a predetermined arrangement. As can be seen, the insert 730 is substantially similar to the insert 630; however, the insert 730 includes a secondary set of trapezoidal groove forming teeth 738 offset from the first set of rectangular groove forming teeth 738 (e.g., offset by a distance of 2.00 mm).

Figure 7C:
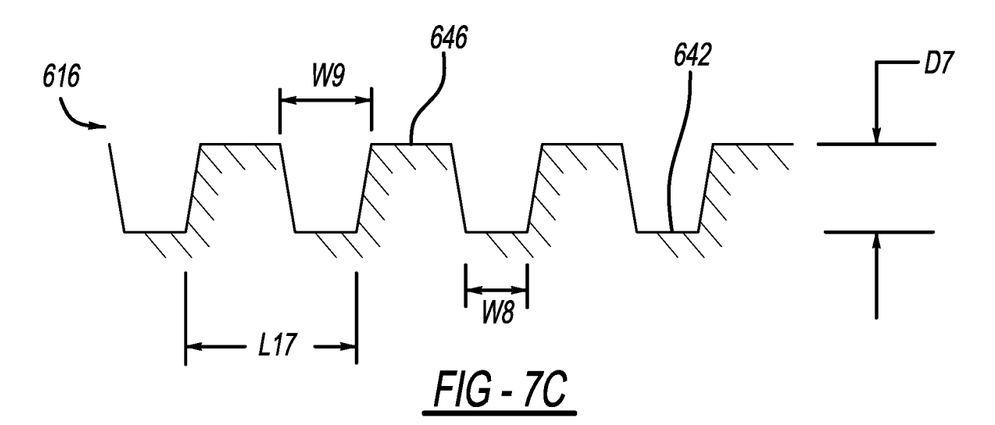
FIG. 7C is a schematic view of a surface profile formed by the exemplary cutting tool inserts of FIG. 7A and 7B.

Referring now to FIG. 7C, a rough machined diameter 616 includes a plurality of grooves 642 formed by the groove forming teeth 638, 738, presented at a depth D7 (e.g., 0.070 mm) from surface 646. Subsequent grooves 642 are separated by a distance L17 (e.g., 0.40 mm) from groove lead end-to-lead end, with each groove 642 having a root width W8 (e.g., 0.150 mm) and a width at the outer surface W9 (e.g., 0.20 mm). The exemplary inserts 630, 730 provide a repeatable surface that maximizes the action of the secondary roughening tool (e.g., medium pressure water jet) during the subsequent roughening steps. As should be understood, each groove 642 in the rough machined diameter 616 is formed by the first tooth 638-1. The second tooth 638-2 is designed to cut only if the first tooth 638-1 fails (i.e., breaks off). The distinct difference between the inserts 630 and 730 is that the grooves 642 generated by the insert 730 have a double lead.

Figure 7D:
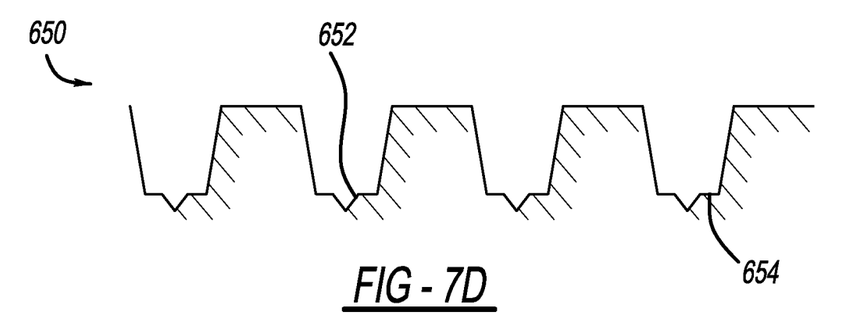
FIG. 7D is a schematic view of a surface profile formed by a modified version of the exemplary cutting tool inserts of FIGS. 7A and 7B.
Figure 7E:
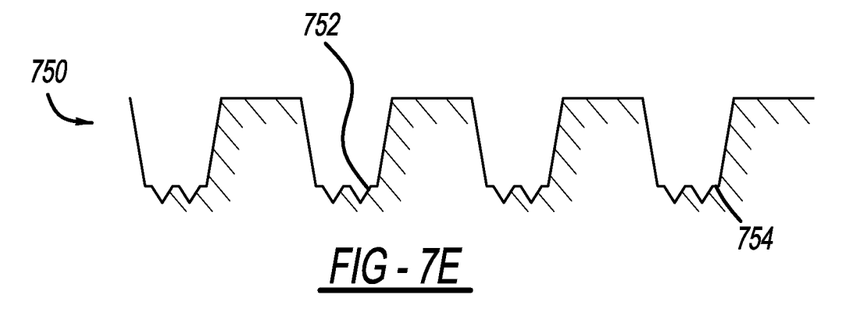
FIG. 7E is a schematic view of a surface profile formed by another modified version of the exemplary cutting tool inserts of FIGS. 7A and 7B.

Referring now to FIG. 7D and 7E, optional surface profiles for a rough machined diameter 650, 750 are depicted. The rough machined diameters 650, 750 are similar to the rough machined diameter 616 but for the addition of micro-scratches 652, 752 at a root surface 654, 754. The micro-scratches 652 are formed by the addition of shaping teeth (not shown) arranged on the insert 630 at the tip width W5, while the micro-scratches 752 are formed by the addition of shaping teeth (not shown) arranged on the insert 730 at the tip widths W5 of both first and second groupings of teeth 738. Although the micro-scratches 652, 752 are depicted at the root surfaces 654, 754, it should be understood that any number of micro-scratches at any location can be achieved through placement of the shaping teeth on the insert 630, 730 at various heights and distances.

Figure 8A:
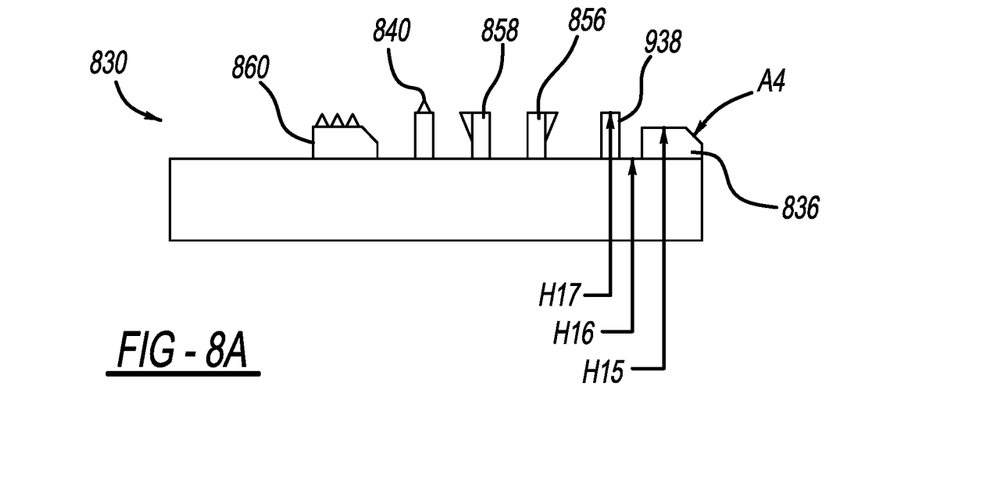
FIG. 8A is a perspective view of another exemplary cutting tool insert according to the present disclosure.

With reference now to FIG. 8A, another exemplary insert 830 for a cutting tool is depicted having a plurality of cutting edges (e.g., leading tooth 836, rectangular groove forming tooth 938, first-pass dovetail groove forming tooth 856, second-pass dovetail groove forming tooth 858, root shaping tooth 840, surface shaping tooth 860) adapted to come in contact with the workpiece within a cutting zone to remove material therefrom in a predetermined arrangement. As can be seen, the insert 830 includes the leading tooth 836 having an angled leading end A4 (e.g., 30 degrees) and a projection height H15 (e.g., diameter of 93.02 mm). The leading tooth 836 may extend over any predetermined length (e.g., approximately 0.3 mm). The height H15 of the tooth 836 has a reduced projecting length in comparison with the subsequent groove forming teeth 938, 856, 858 and shaping teeth 840, 860. The leading tooth 836 can be used for guiding and stabilizing the groove forming and shaping teeth 938, 856, 858, 840, 860 at insertion into the rough machined diameter (e.g., diameter of 91.00 mm). Furthermore, the angled leading end A4 allows for a deeper cut into the material and reduces the hoop stress that would be generated by a conventional thread angle form.

In one example, the groove forming teeth 938, 856, 858 extend from a root surface H16 (e.g., diameter of 92.75 mm) to a projecting height H17 (e.g., diameter of 93.16 mm). The groove forming teeth 938, 856, 858 are arranged to define a multi-pass forming operation for forming a dovetail groove 842 in the rough machined diameter 816. In particular, the groove forming tooth 938 may be presented in a rectangular configuration for removing a bulk material form. The first- and second-pass dovetail groove forming teeth 856, 858, subsequently enter the groove formed by the rectangular groove forming tooth 938 and each remove an undercut portion of the rough machined diameter 816 to form the dovetail groove 842 therein (see FIG. 8B and 8C). The shaping teeth 840, 860 terminate with an equilateral triangular configuration having a rounded upper tip (e.g., height of tooth from base to tip of 0.025 mm). When the cutting tool is introduced to the rough machined diameter in a spiral rotation operation (e.g., feed at 0.4 mm per revolution), subsequently introduced teeth or cutting edges (e.g., groove forming teeth 938, 856, 858, shaping teeth 840, 860) primarily experience a constant force, thereby improving groove precision and loading on tool teeth. The insert 830 can form threads that are continuous or discontinuous so as to define threads having multiple starts (for instance double lead, triple lead, and the like), which provide a locking mechanism for the coating within the cylinder bore.

Figure 8B:
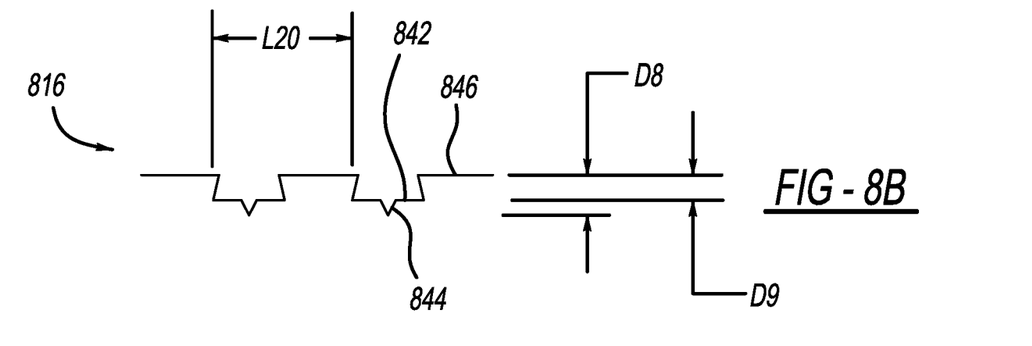
FIG. 8B is a schematic view of a surface profile formed by the exemplary cutting tool insert of FIG. 8A.

With reference now to FIG. 8B, the rough machined diameter 816 includes a plurality of grooves 842 formed by the groove forming teeth 938, 856, 858 and a plurality of micro-scratches 844 formed by the shaping teeth 840, 860. The grooves 842 are presented at a depth D8 (e.g., 0.07 mm) from surface 846, while the micro-scratches 844 are presented at a depth D9 (e.g., 0.10 mm) from surface 846.

Subsequent grooves 842 are separated by a distance L20 (e.g., 0.4 mm) from groove lead end-to-lead end, with a micro-scratch arranged centrally within each groove 842. The exemplary insert 830 provides a repeatable surface that maximizes the action of the secondary roughening tool (e.g., medium pressure water jet) during the subsequent roughening steps.

Figure 8C:
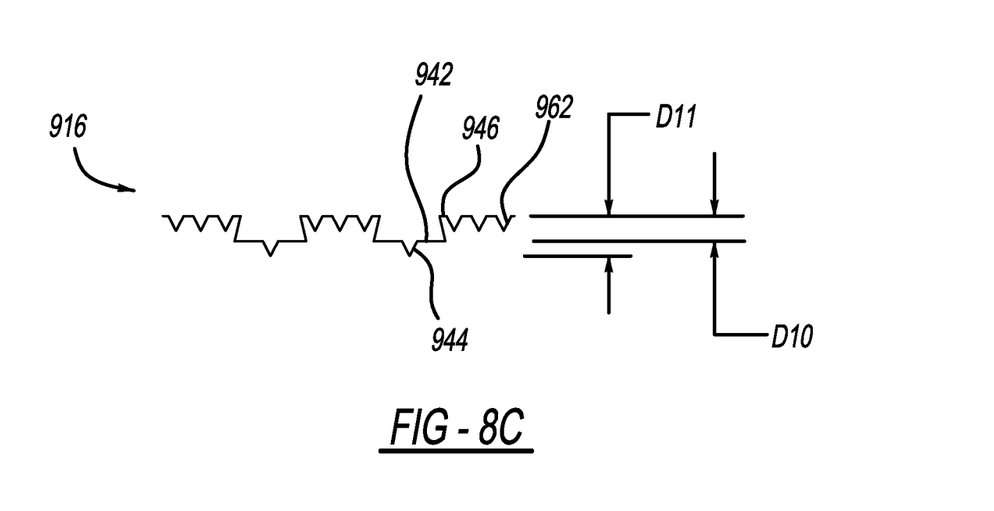
FIG. 8C is a schematic view of a surface profile formed by a modified version of the exemplary cutting tool insert of FIG. 8A.

With reference now to FIG. 8C, a rough machined diameter 916 includes a plurality of grooves 942 formed by the groove forming teeth 938, 956, 958 and a plurality of micro-scratches 944, 962 formed by the shaping teeth 940, 960. The grooves 942 are presented at a depth D10 (e.g., 0.07 mm) from surface 946, while the micro-scratches 944 formed by the shaping tooth 940 are presented at a depth D11 (e.g., 0.10 mm) from surface 946. Additional micro-scratches 962 are also presented on the surface 946, as formed by shaping teeth 960. Although one micro-scratch is depicted at the root surface 942, it should be understood that any number and location of micro-scratches can be achieved through appropriate placement of shaping teeth on the insert 830 at various heights and distances. Furthermore, micro-scratches can be included at the root of the groove 942 and/or on top of the surface 946 to optimize the action of the secondary roughening tool (e.g., medium pressure water jet) during the subsequent roughening steps.

Figure 9:
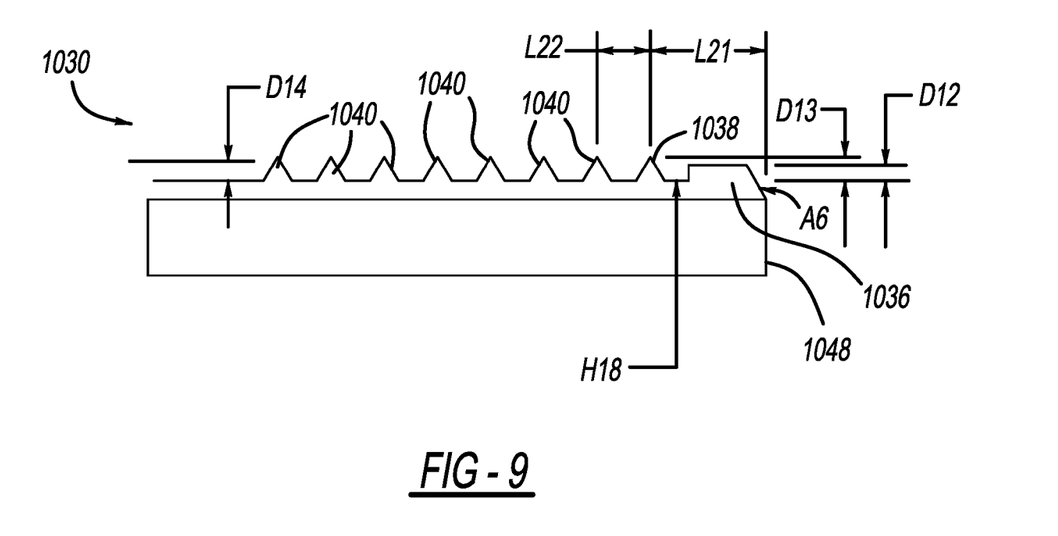
FIG. 9 is a perspective view of another exemplary cutting tool insert according to the present disclosure.

With reference now to FIG. 9, another exemplary insert 1030 for a cutting tool is depicted having a plurality of cutting edges (e.g., leading tooth 1036, groove forming tooth 1038, shaping teeth 1040) adapted to come in contact with the workpiece within a cutting zone to remove material therefrom in a predetermined arrangement. As can be seen, the insert 1030 includes the leading tooth 1036 having an angled leading end A6 (e.g., 30 degrees) and a projection height D12 (e.g., 0.14 mm) from a root surface H18 (e.g., diameter of 92.75 mm). The leading tooth 1036 may extend over any predetermined length (e.g., approximately 0.5 mm). The height H18 of the tooth 1036 has a reduced projecting length in comparison with the subsequent groove forming tooth 1038 and shaping teeth 1040. The leading tooth 1036 can be used for guiding and stabilizing the groove forming teeth 1038 at insertion into the rough machined diameter (e.g., diameter of 91.00 mm). Furthermore, the angled leading end A6 allows for a deeper cut into the material and reduces the hoop stress that would be generated by a conventional thread angle form.

In one example, the groove forming tooth 1038 extends from the root surface H18 to a projection height D13 (e.g., 0.18 mm). The groove forming tooth 1038 may be presented in an equilateral triangular configuration having a rounded upper tip (e.g., radius of 0.02 mm) at a distance L21 from the proximal end 1048 (e.g., 0.83 mm). The shaping teeth 1040 may be arranged to extend from the root surface H18 to a projecting height D14 (e.g., 0.15 mm). The shaping teeth 1040 may also be presented in an equilateral triangular configuration having a rounded upper tip (e.g., radius of 0.01 mm). Each of the teeth 1038, 1040 is spaced by a distance L22 (e.g., 0.44-0.46 mm). When the cutting tool is introduced to the rough machined diameter in a spiral rotation operation, subsequently introduced teeth or cutting edges (e.g., groove forming tooth 1038, shaping teeth 1040) primarily experience a constant force, thereby improving groove precision and loading on tool teeth. The insert 1030 can form threads that are continuous or discontinuous so as to define threads having multiple starts (e.g., double lead, triple lead, and the like), which provide a locking mechanism for the coating within the cylinder bore.

Embodiments of the present disclosure are described herein. This description is merely exemplary in nature and, thus, variations that do not depart from the gist of the disclosure are intended to be within the scope of the disclosure. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for various applications. Various combinations and modifications of the features consistent with the teachings of this disclosure, however, could be desired for particular applications or implementations.

What is claimed is:

1. A tool insert comprising:
   a first tooth arranged on a surface of the tool insert at a proximal end thereof, the first tooth having an angled leading end and a first tooth height;
   a second tooth spaced from the first tooth by a first distance along the surface of the tool insert, the second tooth having a second tooth height greater than the first tooth height; and
   a third tooth spaced from the second tooth by a second distance along the surface of the tool insert, the third tooth having an extending angled portion, wherein the first tooth is configured to form a first groove in a bore surface, the second tooth is configured to increase the depth of the first groove, and the third tooth is configured to provide at least one micro-scratch to one of the first groove and the bore surface.

2. The tool insert of claim 1, wherein the second tooth is configured in one of a triangular, rectangular, trapezoidal, and dovetail form.

3. The tool insert of claim 1, further comprising a fourth tooth spaced from the third tooth by a third distance and having the second tooth height, and a fifth tooth spaced from the fourth tooth by the second distance and having an extending angled portion similar to the extending angled portion of the third tooth.

4. The tool insert of claim 1, wherein the angled leading end of the first tooth is one of thirty degrees and forty-five degrees from vertical.

5. The tool insert of claim 1, wherein the third tooth has a third tooth height less than or equal to the second tooth height.

6. A tool insert comprising:
   a first tooth arranged on a surface of the tool insert at a proximal end thereof, the first tooth having an angled leading end and a first tooth height;
   a second tooth spaced from the first tooth by a first distance along the surface of the tool insert, the second tooth having a second tooth height greater than the first tooth height; and
   a third tooth spaced from the second tooth by a second distance along the surface of the tool insert, the third tooth having a third tooth height greater than the first tooth height and less than or equal to the second tooth height, wherein the second and third teeth are configured in one of a triangular, rectangular, trapezoidal, and dovetail from.

7. The tool insert of claim 6, wherein the angled leading end of the first tooth is one of thirty degrees and forty-five degrees from vertical.

8. The tool insert of claim 6, further comprising an extending angled portion on at least one of the surface of the tool insert, the second tooth, and the third tooth, wherein the first tooth is configured to form a first groove in a bore surface, the second tooth is configured to increase the depth of the first groove, and the extending angled portion is configured to form at least one micro-scratch to one of the first groove and the bore surface.

9. The tool insert of claim 6, further comprising a fourth tooth spaced from the third tooth by a third distance and having the second tooth height, and a fifth tooth spaced from the fourth tooth by the second distance and having the third tooth height.

10. The tool insert of claim 6, further comprising:
a fourth tooth spaced from the third tooth by a third distance along the surface of the tool insert;
a fifth tooth spaced from the fourth tooth by a fourth distance along the surface of the tool insert; and
a sixth tooth spaced from the fifth tooth by a fifth distance along the surface of the tool insert, wherein the second tooth has a rectangular form, the third tooth has a rectangular form with a first projecting side, the fourth tooth has a rectangular form with a second projecting side, the fifth tooth has an extending angled portion at an upper surface thereof, and the sixth tooth has a plurality of extending angled portions at an upper surface thereof.

* * * * *